June 30, 1953 D. N. MacDONALD 2,644,042
MULTILINE TELEPHONE SUBSTATION INSTRUMENT AND CIRCUITS
Filed Jan. 17, 1951
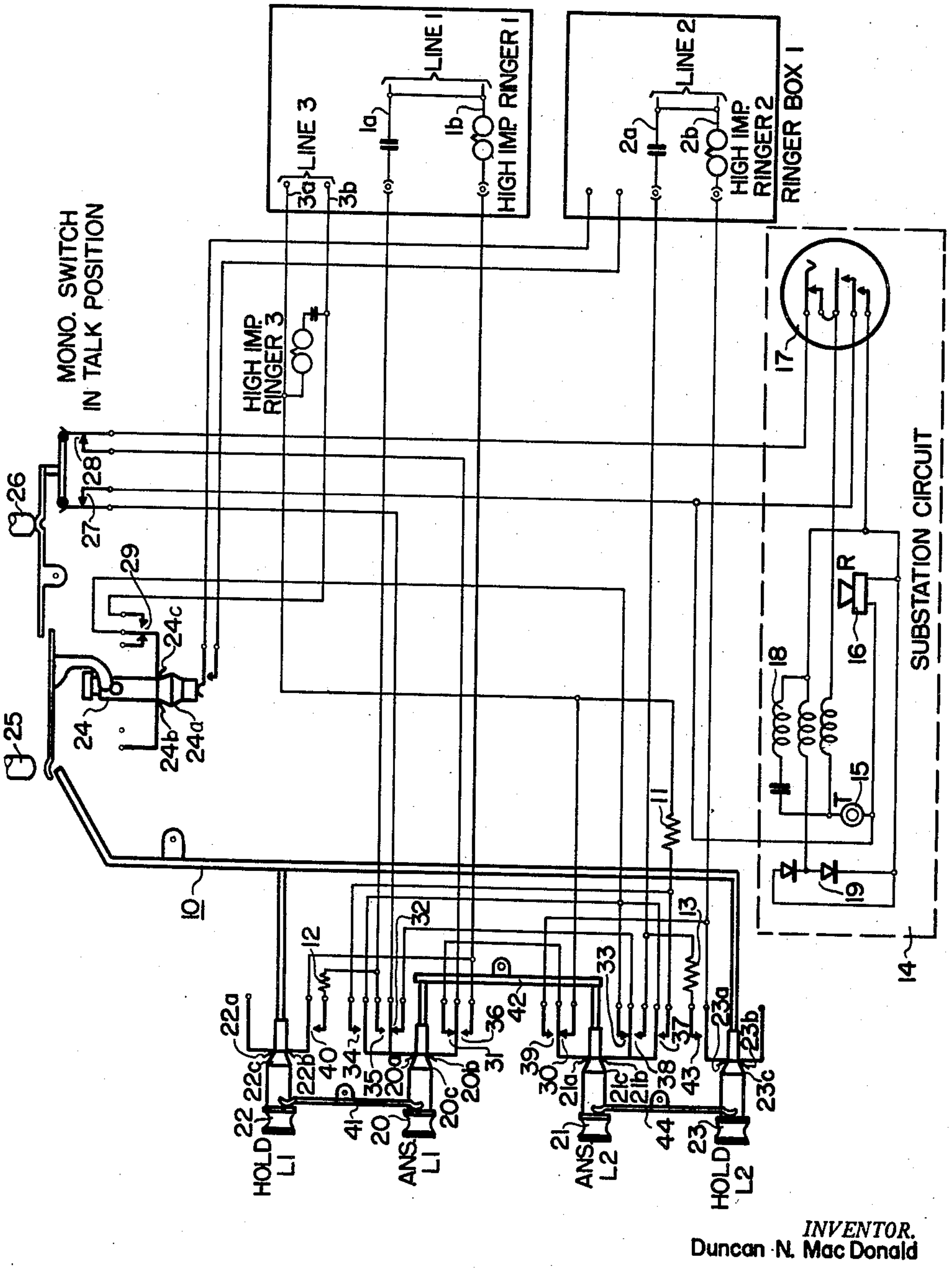
*INVENTOR.*
Duncan N. Mac Donald
*BY* McWatters Owen
Attorney Patented June 30, 1953

2,644,042

UNITED STATES PATENT OFFICE 2,644,042

MULTILINE TELEPHONE SUBSTATION INSTRUMENT AND CIRCUITS

Duncan N. MacDonald, Evanston, Ill., assignor to Automatic Electric Laboratories, Inc., Chicago, Ill., a corporation of Delaware Application January 17, 1951, Serial No. 206,376

5 Claims. (Cl. 179—81)

The present invention relates in general to telephone substation instruments and more particularly to the electrical circuits therefor.

Substation telephone instruments of certain types are provided with a series of answering and holding keys for controlling the operation of substation electrical circuits thus permitting initiating, answering and holding of calls on a plurality of lines, which may be local lines, trunk lines or intercommunication lines, terminating in the substation instrument. In such instruments three lines may terminate therein, and when all the answer keys are in the normal position, the substation talking circuit is connected to a line, which may be designated line 3. When a call is received on a line, designated line 1, the answer key associated therewith is operated to provide a talking circuit to line 1. Further, a call may be received on a line designated line 2, while the call on line 1 is held, by operating a holding key associated therewith, and to complete a talking circuit for the call on line 2, the answer key associated therewith is operated.

Mechanical linkage is provided between the answer keys and the hold keys so that when an answer key is operated, the other answer key, if operated, is restored, and likewise the holding key associated with the last operated answer key, if operated, is restored.

Using the aforementioned arrangement with three lines terminating in the substation instrument, if a call is answered or initiated on line 1, and subsequently held by operating the holding key associated therewith to receive a second call on the line 2 by operating the answer key associated with line 2 or vice versa, a talking circuit is automatically transferred to line 3 during the interim period in which the answer keys for lines 1 and 2 are ineffectively in the normal position. As a result thereof, the transfer to line 3 will either flash the operator or cycle the finder equipment, depending upon whether manual or automatic lines are involved. The flashing of the operator or the cycling of the finder equipment hinders proper functioning and operation of the system.

Further, when a call is received on line 3, and subsequently a call is received on either lines 1 or 2, it is inconvenient for a subscriber to first operate a holding key and then operate an answer key associated with the last received call.

Accordingly, an important object of the present invention is to provide a substation instrument wherein undesirable flashing is eliminated.

Another object of the present invention is to provide a substation instrument wherein manual operation of an answer key is required to answer or initiate a call on any of the lines terminating therein.

Another object of the present invention is to provide a substation instrument wherein holding of one line is accomplished by operating either answer key of the remaining lines.

The above objects and others not specifically mentioned will be apparent from the detailed description, which together with the drawing constitutes a preferred embodiment of the invention.

Figure 1 is a schematic diagram of the substation electrical circuits embodying the present invention and a diagrammatic representation of the operating keys and plungers therefor.

The present invention is an improvement over now pending application, "Multi-Line Telephone Substation Instruments and Circuits," Serial No. 98,236, filed on June 10, 1949, by inventors F. E. Wood and Robert L. Sargisson.

A substation instrument 10 is herein provided having a plurality of communication lines terminating therein, such as lines 1, 2 and 3. Lines 1, 2 and 3 may be either local lines, trunk lines, intercommunication lines, or any combination thereof.

Each line is provided with an individual high impedance ringer to serve individually their respective lines. Each communication line has an individual holding bridge 11, 12, and 13, which are effective for holding calls to the respective lines.

Selectively connectable to lines 1, 2 and 3 is a substation circuit 14, which is of the usual type and in the preferred embodiment includes a transmitter 15, a receiver 16, a calling device 17, an inductance coil 18, and a click suppressor 19.

For initiating and answering calls to lines 1 and 2 through the substation circuit 14, suitable means such as push button answer keys 20 and 21 are provided. The operation of answer key 20 completes a circuit from line 1 through the substation circuit 14 and similarly the operation of answer key 21 completes a circuit from line 2 through the substation circuit 14. For holding calls on lines 1 and 2, means such as holding keys 22 and 23 are provided. Holding key 22 completes a holding bridge circuit for line 1 and similarly, holding key 23 completes a holding bridge circuit for line 2.

Answer keys 20 and 21 are double interlocking keys so that when the subscriber depresses either answer key, he simultaneously restores to normal position the other answer key, if it is in an operated position; and the holding key associated with last depressed answer key, if it is also in an operated position. Similarly, the depressing of either holding key restores to a normal position the associated answer key, if it is in an operated position. The structure and the mechanical interlinking operation of the keys have been described in detail in the aforementioned pending application.

For answering and initiating calls on line 3, thereby completing a circuit through the substation circuit 14, suitable means such as push pull key 24 is herein provided. The structure and mechanical operation thereof has been described in the aforementioned pending application.

Plungers 25 and 26 are located in the cradle of the substation instrument and are actuated by removal and replacement of the handset on the cradle. Plunger 25 is a release plunger and functions to release any operated key when depressed by the placement of the handset on the cradle. Plunger 26 is a flash plunger which permits opening and closing of the monophone switchhook contacts 27 and 28 without interfering with the operated condition of any of the keys. The switch contacts 27 and 28 are shown in the talking position, since the handset is removed from the cradle. The mechanical operations of the aforementioned have been described in detail in the previously mentioned pending application.

According to the invention, for a call to be initiated or answered on any of the communication lines, the answer key associated therewith must first be operated. To initiate or answer a call on line 3, the push pull key 24 is operated by the subscriber, which in the present instance is in the raised position, and is held in the raised position by suitable means such as springs 24*b* and 24*c*. The operating of key 24 causes the bevel portion 24*a* to actuate a set of springs to close contacts 29. Consequently, a talking circuit is completed for a call on line 3 over the following path: terminal 3*a*, contacts 30, contacts 31, contacts 28, through the substation circuit 14 in a manner well known in the art, contacts 27, contacts 32, contacts 33, contacts 29 and terminal 3*b*. For answering a call on line 3, the subscriber is aware of such an incoming call by the operation of ringer 3.

Let us assume that the subscriber has a call on line 3, and subsequently a call is received on line 1. The subscriber is aware of such an incoming call by the operation of ringer 1. To receive the call on line 1, the subscriber must first operate key 20, which in the present instance is depressing the key 20. Key 20 is held in position by suitable means such as springs 20*a* and 20*b*. By operating key 20, a bevel portion thereof 20*c* actuates a set of springs to open contacts 32 and 31 and to close contacts 34, 35 and 36. As a result thereof, simultaneously a holding circuit is completed for line 3; the continuity of the talking circuit for line 3 is opened, and a talking circuit is completed for line 1.

The opening of contacts 31 and 32 break the continuity of the talking circuit for line 3 over a previously described path. Contacts 34 make to complete a holding bridge circuit for line 3 over the following path: terminal 3*a*, holding bridge resistance 11, contacts 34, contacts 29 and terminal 3*b*. The talking circuit for line 1 is completed by the closing of contacts 35 and 36 over the following path: terminal 1*a*, contacts 35, contacts 27, through the substation circuit 14 in a manner well known in the art, contacts 28, contacts 36 and terminal 1*b*.

Assuming at this point, that a call is received on line 2. The subscriber is aware of such a call by the operation of ringer 2. The subscriber, in the first instance, completes a holding bridge circuit for line 2 by operating the holding key 22, which in the preferred embodiment, is the depression thereof. The key 22 is held in position by suitable means such as springs 22*a* and 22*b*. A set of springs are operated by a bevel portion 22*c* of key 22 to close contacts 40 and thereby completing a holding bridge circuit for line 1 over the following path: terminal 1*a*, holding bridge resistance 12, contacts 40, and terminal 1*b*.

Simultaneously with the operating of the holding key 22, the answer key is restored to normal position by mechanical interlinking members such as pivotal member 41. As a result thereof contacts 35 and 36 open the talking circuit for line 1 and contacts 34 open the holding bridge circuit for line 3. However, line 3 remains held since contacts 30 and 31 close to once again complete a talking circuit for line 3 in a manner previously described.

The subscriber now operates answer key 21, which in the preferred embodiment is depressed, to receive a call on line 2. The answer key 21 is held in position by suitable means such as springs 21*a* and 21*b*. By operating answer key 21, a set of springs are actuated to open contacts 30 and 33; and to close contacts 37, 38 and 39.

The opening of contacts 30 and 33 once again breaks the continuity of the talking circuit for line 3, and contacts 37 close to complete a holding bridge circuit for line 3 over the following path: terminal 3*a*, holding bridge resistance 11, contacts 37, contacts 29, and terminal 3*b*. A talking circuit for line 2 is completed by the closing of contacts 38 and 39 in the following manner: terminal 2*a*, contacts 38, contacts 32, contacts 27, through the sub-station circuit 14 in a manner well known in the art, contacts 28, contacts 31, contacts 39 and terminal 2*b*.

In view of the foregoing, it is apparent that there can be no simultaneous talking on the several lines. It is to be noted that mechanical interlinkage such as pivotal member 42 is provided to prevent answer keys 20 and 21 to be operated at the same time. The operation of one answer key automatically restores the other.

Further, it is apparent that when a call is received on lines 1 or 2 subsequent to receiving a call on line 3 that the operation of answer key 20 or 21 will provide a holding bridge circuit for automatically holding a call on line 3.

For preventing flashing an operator or cycling the finder equipment, when there is no call on line 3, line 3 is now provided with an associated answer key 24 individual to line 3. When the key 24 is in the normal position, continuity to line 3 is broken by having contacts 29 opened.

Assume that a call is had on line 3 and the talking circuit therefor is completed in a previously described manner. Subsequently, a call is received on line 1. The subscriber operates the holding key 23 by depressing the same to hold a call on line 2. The holding key 23 is held in position by suitable means such as spring 23*a* and 23*b*. A set of spring contacts are actuated by a bevel portion 23*c* and contacts 43 are closed to complete a holding circuit for line 2 over the following path: terminal 2*a*, holding bridge resistance 13, contacts 43, and terminal 2*b*.

Mechanical interlinkage, such as pivotal member 44 automatically restores the answer key 21 to the normal position.

Answer key 21 restores to prepare a talking circuit to line 3 by closing contacts 30 and 33. Contacts 39 and 38 break to open the talking circuit for line 2.

To receive the call on line 1, the subscriber operates answer key 20 and completes a talking circuit for line 1 in a manner previously described. During the interim period when both answer keys are in the normal position, the contacts 29 are open to prevent a flashing circuit over line 3.

While the invention has been described with a certain degree of particularity, it should be apparent that numerous modifications may be effected without departing from the scope of the appended claims.

What is claimed is:

1. In a substation instrument, a first, second and third communication line terminating therein; a first and second answer key individually associated with said first and second lines respectively; a substation circuit selectively connectable to said lines; a holding circuit for said third line, and means responsive to the operation of said first key for at times connecting said holding circuit to said third line and connecting said first line to said substation circuit and said means responsive to the operation of said second key for connecting at other times said holding circuit to said third line and connecting said second line to said substation circuit.

2. In a substation instrument, a first, second and third communication line terminating therein; a first, second and third answer key individually associated with said first, second and third lines, respectively; a substation circuit selectively connectable to said lines; a first, second and third holding bridge circuit for said first, second and third lines, respectively; means responsive to the operation of said third answer key for connecting said third line to said substation circuit; means responsive to the operation of said first answer key for at times connecting said third holding bridge circuit to said third line and connecting said first line to said substation circuit, said last means responsive to the operation of said second answer key for connecting at other times said holding bridge circuit to said third line and connecting said second line to said substation circuit; a first and second holding key for said first and second lines, respectively; means responsive to said first holding key for connecting said first holding bridge circuit to said first line; and means responsive to said second holding key for connecting said second holding bridge circuit to said second line.

3. In a telephone substation set, a substation circuit, a first, second and third answer key each having a normal and operated position, a first set of contact springs actuated by said first key, a second set of contact springs actuated by said second answer key, a third set of contact springs actuated by said third answer key, a first line terminating in said first set of contact springs and said first line connected to said substation circuit only in response to said first key being in the operated position, a second line terminating in said second set of contact springs and said second line connected to said substation circuit only in response to said second answer key being in the operated position, a third line terminating in said third set of contact springs and said third line connected to said substation circuit only in response to said third key being in the operated position and a holding bridge circuit for said third line terminating in said first and second sets of contact springs, said holding bridge circuit connected across said third line at times in response to said first key being in operated position and at other times in response to said second key being in the operated position.

4. In a telephone substation set, a substation circuit; a first, second and third answer key, each having a normal and operated position; a first set of contact springs actuated by said first answer key; a second set of contact springs actuated by said second answer key; the other set of contact springs actuated by said third answer key, a first line terminating in said first set of contact springs and said first line connected to said substation circuit only in response to said first key being in the operated position; a second line terminating in said second set of contact springs and said second line connected to said substation circuit only in response to said second key being in the operated position; a third line terminating in said third set of contact springs and said third line connected to said substation circuit only in response to said third key being in the operated position; a first and second holding key, each having a normal and operated position; a fourth set of contact springs actuated by said first holding key; a fifth set of contact springs actuated by said second holding key, a first holding circuit terminating in said fourth set of contact springs for holding said first line in response to said first holding key being in the operated position; a second holding circuit terminating in said fifth set of contact springs for holding said second line in response to said second holding key being in the operated position; and a third holding circuit terminating in said first and second set of contact springs for holding said third line in response to either said first answer or said second answer key being in the operated position.

5. In a substation instrument, a plurality of communication lines terminating therein, a substation circuit selectively connectable to said lines, a plurality of answer keys, each of said keys having contacts controlled thereby to connect its associated line to the substation circuit, a holding circuit for one of said lines, and means responsive to the operation of one of said keys associated with one of said lines for connecting said holding circuits to said other line and connecting said one line to said substation circuit.

DUNCAN N. MacDONALD.

References Cited in the file of this patent

UNITED STATES PATENTS

| Number | Name | Date |
|---|---|---|
| 1,097,760 | Koltonski | May 26, 1914 |
| 1,783,310 | Saunders et al. | Dec. 2, 1930 |
| 2,212,216 | Tradup | Aug. 20, 1940 |
| 2,218,328 | Curran et al. | Oct. 15, 1940 |
| 2,273,530 | King | Feb. 17, 1942 |
| 2,338,757 | Curran | Jan. 11, 1944 |
| 2,341,027 | Edwards | Feb. 8, 1944 |